US006082957A

United States Patent [19]

Kupka, Jr.

[11] Patent Number: 6,082,957
[45] Date of Patent: Jul. 4, 2000

[54] WHEELCHAIR ACCOMMODATIONS FOR A VEHICLE

[76] Inventor: John C. Kupka, Jr., 205 S. Division, Montour, Iowa 50173

[21] Appl. No.: 09/032,120

[22] Filed: Feb. 27, 1998

[51] Int. Cl.[7] .................... B60P 3/00

[52] U.S. Cl. .................... 414/540; 414/541; 414/921; 187/267; 296/25

[58] Field of Search .................... 414/540, 541, 414/546, 556, 921; 187/240, 244, 267, 268, 336, 338; 296/25, 204

[56] References Cited

U.S. PATENT DOCUMENTS

| | | | |
|---|---|---|---|
| 2,169,446 | 8/1939 | Hester . | |
| 2,495,046 | 1/1950 | Wolters | 187/244 |
| 3,207,264 | 9/1965 | Melvin | 187/240 |
| 3,258,139 | 6/1966 | Ridgeway | 414/556 |
| 3,941,261 | 3/1976 | Ricci . | |
| 4,253,699 | 3/1981 | Frank . | |
| 4,752,102 | 6/1988 | Rasmussen | 187/244 |
| 4,804,308 | 2/1989 | Hamblin | 414/921 |
| 4,847,972 | 7/1989 | Anderson et al. . | |
| 4,941,799 | 7/1990 | Gordon et al. . | |
| 5,036,951 | 8/1991 | Frangos | 187/264 |
| 5,131,503 | 7/1992 | Billinton, III et al. | 187/240 |
| 5,137,413 | 8/1992 | Ressler . | |
| 5,388,937 | 2/1995 | Farsai . | |
| 5,443,350 | 8/1995 | Wilson | 414/540 |
| 5,848,870 | 12/1998 | Smith et al. | 414/540 |
| 5,915,913 | 6/1999 | Greenlaw et al. | 187/267 |

FOREIGN PATENT DOCUMENTS

| | | | |
|---|---|---|---|
| 2689478 | 10/1993 | France . | |
| 62-46731 | 2/1987 | Japan | 414/921 |
| 2140749 | 12/1984 | United Kingdom | 414/921 |

*Primary Examiner*—Robert P. Olszewski
*Assistant Examiner*—Thuy V. Tran
*Attorney, Agent, or Firm*—Zarley, McKee, Thomte, Voorhees & Sease

[57] ABSTRACT

A vehicle having accommodations for a wheelchair includes an upper floor panel disposed within the vehicle and having a lowerable portion thereof adapted to support a wheelchair, and a lift mechanism mounted below the upper floor panel for lowering and raising the lowerable portion with respect to the upper floor panel. The lift mechanism comprises threaded holes on a protruding part of the lowerable panel. The threaded holes are engaged by a plurality of jack screws. The jack screws can be driven by a motor, sprocket and chain drive system. These accommodations allow a person in the wheelchair to be lowered to a level where they can comfortably see out the windows of the vehicle.

12 Claims, 4 Drawing Sheets

WHEELCHAIR ACCOMMODATIONS FOR A VEHICLE

BACKGROUND OF THE INVENTION

The present invention relates to vehicle accommodations for persons with disabilities. More particularly, this invention relates to a lift mechanism for lowering a portion of the floor inside a passenger van or other vehicle so that a person in a wheelchair can comfortably look out the windows of the van. Besides providing the person in the wheelchair with a more comfortable and enjoyable ride, the mechanism helps limit the movement of the wheelchair when the vehicle is involved in a collision.

It is difficult to transport a person in a wheelchair in conventional vehicles. Typically, a conventional passenger van is equipped with a ramp or lift mechanism extending outside the van for loading the person and their wheelchair into the van. For instance, in FR 2 689 478, Baboulin discloses a lowerable ramp at the rear of a van. Wheelchair users face another challenge once inside the van. The floor of the passenger compartment is generally fixed at a given distance from the ceiling and windows. Given these fixed distances, many wheelchairs (especially the larger ones used by paraplegics and quadriplegics) place the occupant at a level where it is difficult, uncomfortable, and sometimes impossible to see out the windows of the van. This can result in the person in the wheelchair developing unpleasant symptoms such as neck strain, nausea, and headaches. Some of these symptoms are commonly associated with "motion sickness". Therefore, it would be desirable if the floor under the wheelchair could be lowered so the person in the wheelchair could see out the windows.

As shown by Ricci in U.S. Pat. No. 3,941,261, some customizers have modified vans to provide a fixed lower subfloor and a wheelchair ramp. Significant rerouting of various control rods and cables is required to accommodate the lowered floor. Furthermore, the lowered floor reduces the ground clearance of the vehicle because it extends below the existing lower floor panels. Because the floor is fixed, adjustments cannot be made for different sizes of wheelchairs and occupants. When none of the occupants of the van require a wheelchair, the lowered subfloor is unnecessary and may even be a nuisance or safety hazard. Therefore, it is usually desirable for the floor of the vehicle to be substantially flat, planar and on a single level.

Therefore, a primary object of the present invention is the provision of improved wheelchair accommodations for a vehicle.

A further object of this invention is the provision of a lift mechanism for lowering a wheelchair on a portion of the floor of a vehicle to enable the person in the wheelchair to see out the windows without decreasing the existing ground clearance.

A further object of this invention is the provision of a lift mechanism for lowering a wheelchair on a portion of the floor of a vehicle without substantially rerouting existing components extending under the floor.

A further object of this invention is the provision of a lift mechanism which includes jack screws mounted below the upper floor panel for lowering a portion of the floor panel.

A further object of this invention is the provision of a pair of laterally spaced adjustably lowerable floor sections adapted to support the laterally spaced wheels of a wheelchair.

A further object of this invention is the provision of a gravity lowerable intermediate floor section between the pair of laterally spaced floor sections.

A further object of this invention is the provision of one or more channels in the floor of the vehicle for limiting the displacement of the wheelchair wheels in the event of a crash.

These and other objects will be apparent from the drawings, as well as from the description and claims which follow.

SUMMARY OF THE INVENTION

The present invention relates to wheelchair accommodations for a vehicle. This invention addresses the problem of allowing a person in a wheelchair to comfortably see through the windows of the vehicle in which they are riding.

The invention includes a vehicle having a chassis with an upper floor panel disposed within the vehicle. The upper floor panel has a first lowerable portion thereof adapted to support at least one wheel of a wheelchair. The lowerable portion has opposite front and rear ends which are both lowerable with respect to the upper floor panel.

A lift mechanism mounted below the upper floor panel raises and lowers the lowerable portion with respect to the upper floor panel. Thus, the lowerable portion is adjustably lowerable to one of a plurality of levels below the upper floor panel. The lift mechanism is generally disposed outwardly adjacent the outer periphery of the lowerable portion so that it does not interfere with the movement of the lowerable portion.

In one embodiment, the lowerable portion comprises first and second horizontally spaced lowerable sections which are raised and lowered by a synchronized lift mechanism. These sections support the wheels of the wheelchair. An intermediate section overlaps and rests on top of the first and second lowerable sections. The downward travel of the intermediate section may be limited by a hump in the lower floor panel which normally covers the drive shaft of the vehicle. Thus, the intermediate section lowers only as far as the hump, but is lifted by the first and second lowerable sections when they are raised above the level of the hump.

The lift mechanism of the present invention includes a plurality of horizontally spaced rotatable elongated jack screws mounted in an upright position below the upper floor panel and outwardly adjacent the lowerable sections. Each jack screw has an upper and lower end. The lower end of each of the jack screws has a sprocket secured for rotation therewith. A reversible drive motor mounts on the chassis and has dual drive sprockets thereon for drivingly engaging two endless loop drive chains connected respectively to the sprockets on the jack screws under the lowerable sections so as to rotate the jack screws in one direction when the drive sprocket is rotated in that direction by the motor. When the rotation of the motor is reversed, the drive sprockets rotate in an opposite direction and the drive chain, and thereby the jack screws, are rotated in the opposite direction. Position adjustable idler sprockets are mounted to the lower floor between the drive sprockets to help keep the drive chains taut.

The lowerable portion of the upper floor panel has rigidly mounted tie bars extending therefrom with a threaded hole extending vertically therethrough. The jack screws engage the tie bars at the threaded holes. Thus, the lowerable portion of the floor is lowered and raised as the tie bars travel along the longitudinal axis of the jack screws in response to the rotation thereof.

DETAILED DESCRIPTION OF THE PREFERRED EMBODIMENTS

Figure 1:
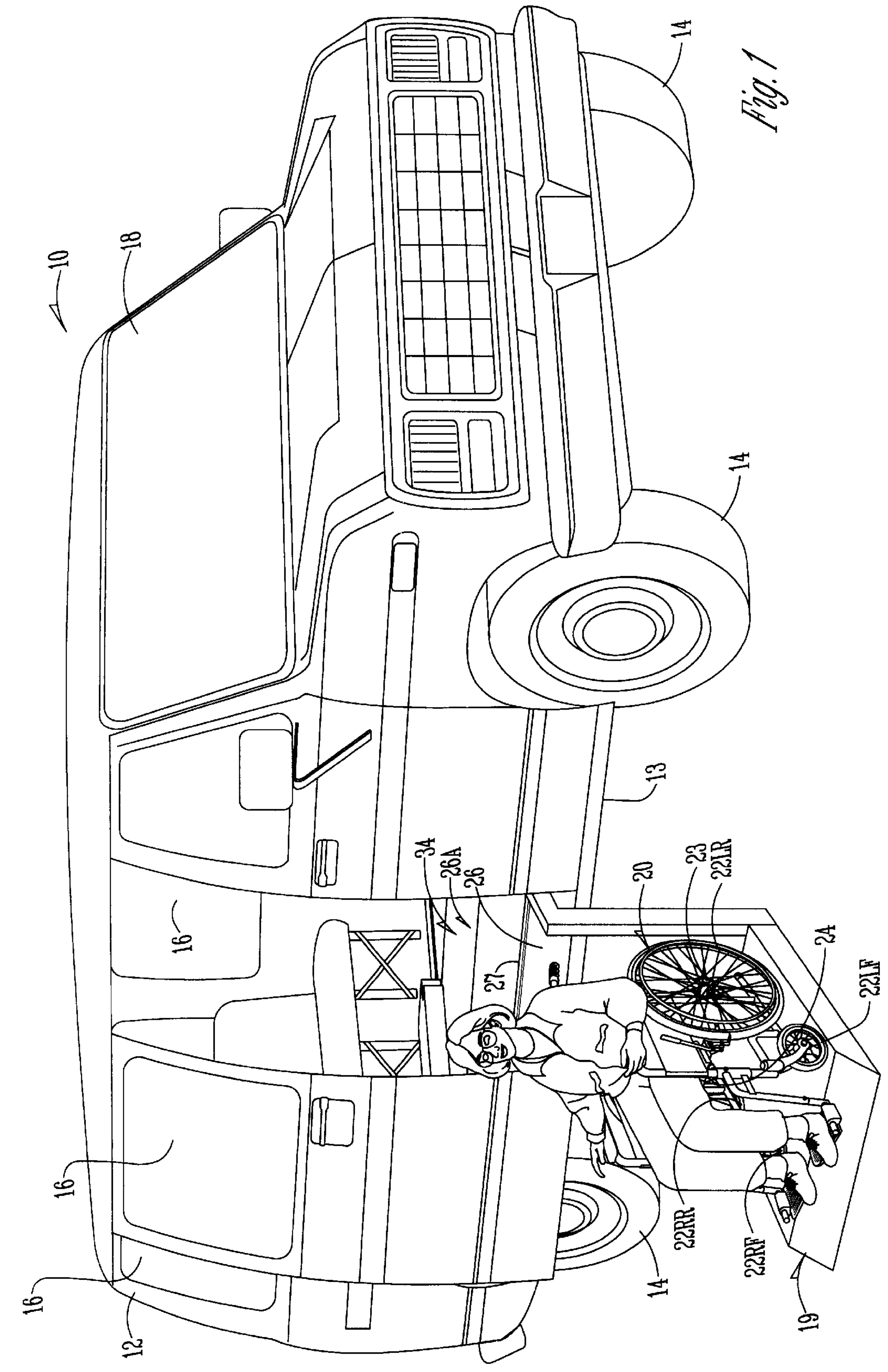
FIG. 1 is a perspective view of a vehicle having the wheelchair accommodations of this invention.

Although the present invention may be adapted to a variety of vehicles, FIG. 1 illustrates a van 10 equipped with the wheelchair accommodations of this invention. The van 10 has a body 12 mounted to a chassis 13 which is supported by a plurality of ground-engaging wheels 14. As is typical of most passenger vans, the van 10 includes a plurality of windows 16, including a windshield 18.

The van 10 has been equipped with a conventional exterior lift 19 which extends outside the vehicle 10 and is not the subject of this invention. The lift 19 assists a person in a wheelchair 20 in entering the vehicle.

The wheelchair 20 has two identical large rotatable wheels 22LR, 22RR which are mounted on a rear axle 23 at the rear of the wheelchair. Two identical pivotal front wheels 22LF, 22RF are mounted on the front of the wheelchair 20. Typically, a seat 24 supports the person in the wheelchair 20. The wheelchair 20 itself is conventional and is not the subject of this invention.

Figure 2:
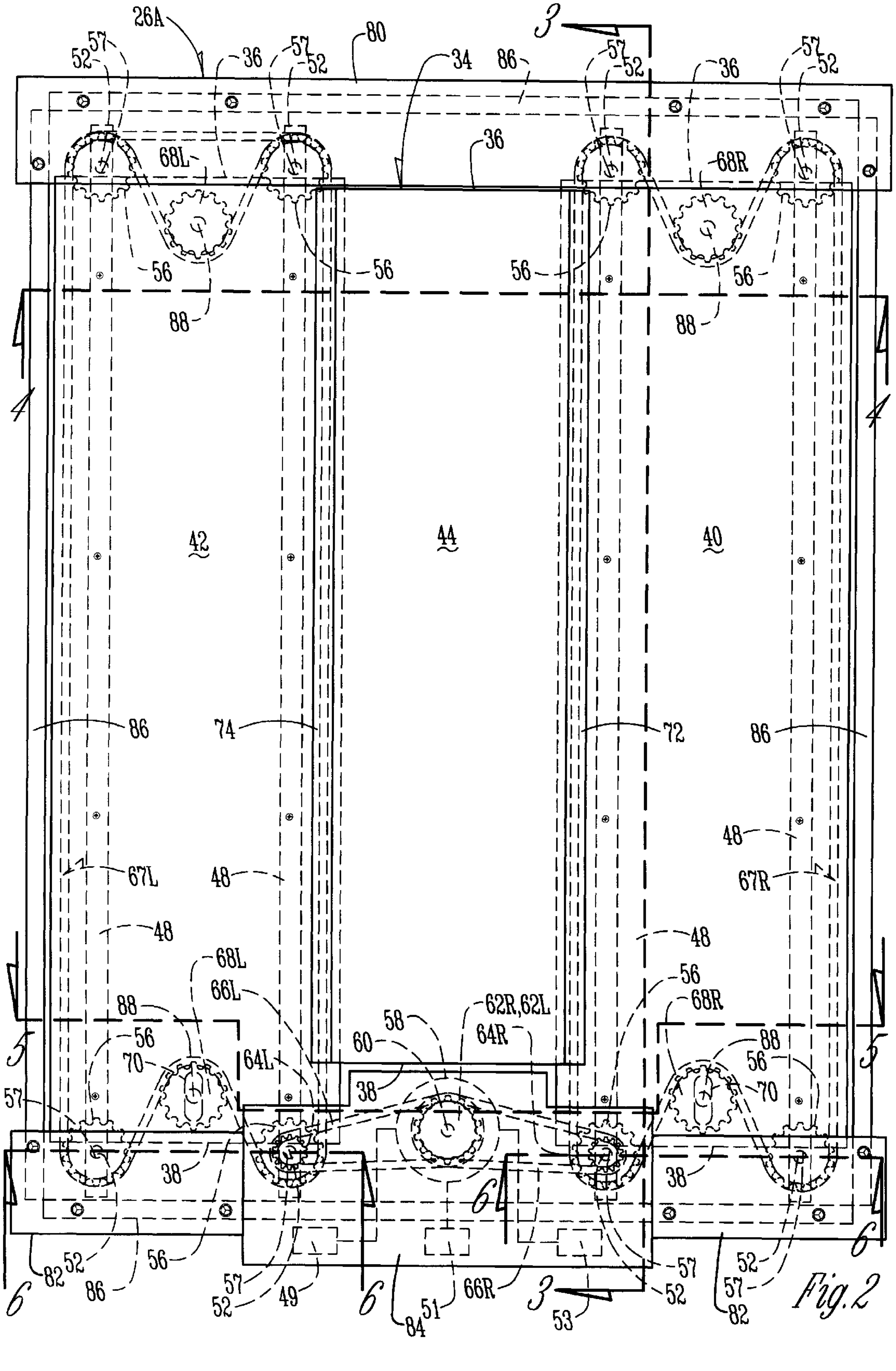
FIG. 2 is a top plan view of the inside floor area of the vehicle of FIG. 1 and shows the lifting mechanism of this invention.
Figures 3, 4, 5:
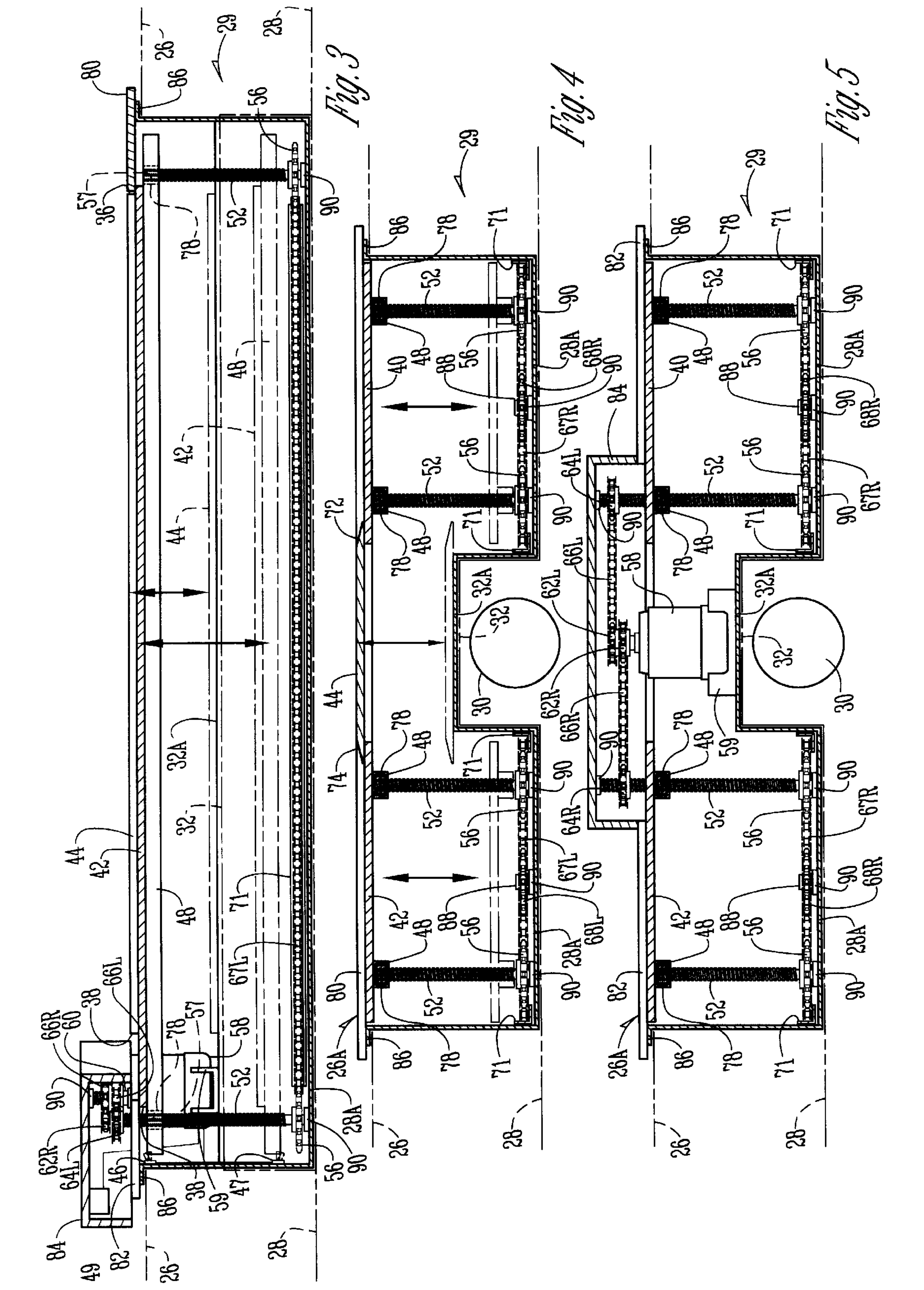
FIG. 3 is a longitudinal cross-sectional view of the lifting mechanism taken along line 3—3 in FIG. 2.
FIG. 4 is a transverse cross-sectional view of the lifting mechanism taken along line 4—4 in FIG. 2.
FIG. 5 is a transverse cross-sectional view of the lifting mechanism taken along line 5—5 in FIG. 2.

FIG. 2 shows the upper floor panel 26 which is disposed in the interior of the van 10. A lower floor panel 28 extends in a generally horizontal direction below the upper floor panel 26. In the preferred embodiment, which is suitable for retrofitting existing vans, the upper floor panel 26 has an aperture 27 therein (FIG. 1) and the invention comprises a lift mechanism 29 (FIGS. 3–5) insertable into the aperature 27. The lift mechanism 29 includes an upper floor member 26A, at least a portion of which is movable, and a stationary lower floor panel 28A (FIGS. 3–5). In the case of rear wheel drive vehicles, a drive shaft 30 (see FIGS. 4 and 5) extends longitudinally under the vehicle 10 from the forwardly mounted engine to the rearwardly mounted differential and axle (not shown). Thus, a raised hump 32 causes part 32A of the lower floor panel 28A to be raised to accommodate the drive shaft 30.

Referring again to FIG. 2, the upper floor panel 26A has a lowerable portion 34 which is adapted to support the wheelchair 20. More particularly, the lowerable portion 34 of the upper floor panel 26A is wide enough and long enough to accommodate the wheels 22LR, 22RR, 22LF, and 22RF of a wheelchair 20. The lowerable portion 34 has opposite front and rear ends 36, 38. Preferably the lowerable portion 34 comprises a first or right section 40, a second or left lowerable section 42, and a third or intermediate section 44 interposed between portions 40 and 42. The intermediate section 44 overlaps the right and left sections 40, 42 as shown in FIG. 4. The lowerable portion 34 constitutes a vertically movable platform which can be raised and lowered within the aperture 27.

Rigid plate steel approximately 14 gauge thick is the preferred material for forming the lowerable portion 34 and the other panels of the lift mechanism insert. This is slightly heavier than the 16 gauge steel commonly used to the upper and lower floors 26, 28. However, one can use other materials without detracting from the invention, provided such materials have the strength and rigidity necessary to support the wheelchair and its occupant.

Figure 6:
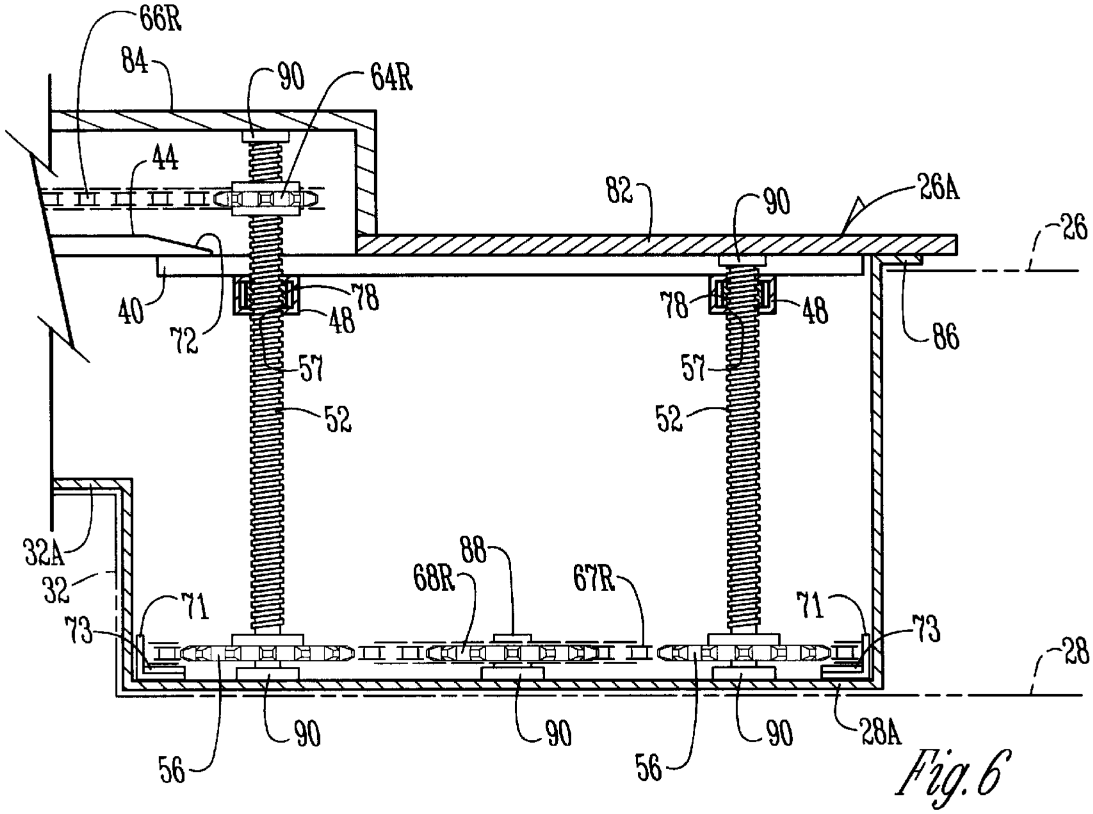
FIG. 6 is a transverse vertical sectional view taken along line 6—6 in FIG. 2.

Laterally spaced tie bars 48 formed of electrical unistrips extend longitudinally on the lower sides of sections 40 and 42. Screws 50 attach the tie bars 48 to the respective sections 40 and 42. The tie bars 48 have a threaded hole 57 therein near each end. The threaded holes 57 preferably comprise a threaded nut 78 attached to the tie bars 48 as best shown in FIG. 6.

As best seen in FIGS. 2–5, a plurality of jack screws 52 are horizontally spaced and mounted in an upright position below the upper floor panel 26A outwardly adjacent the lowerable portion 34.

The jack screws 52 are rotatable within bushing blocks or bearings 54 mounted on the lower floor panel 28A. The jack screws 52 preferably have American National Standard Unified National Coarse threads thereon, but other types of thread forms will suffice, including Acme threads. Jack screws 52 with ⅝–11 UNC threads have performed perform well. The lower end of each of the jack screws 52 has a sprocket 56 secured for rotation therewith. The upper ends of the jack screws 52 extend through the threaded holes 57 in the tie bars 48.

A reversible electric motor 58 rigidly mounts on the raised part 32A of the lower floor panel 28A near the rear of the aperture 27. A riser block 59 may be necessary to elevate the motor 58 to the desired height. The motor 58 resides approximately midway between the inner rear set of sprockets 56 and forwardly adjacent thereof. The motor 58 includes an output shaft 60 having a central longitudinal axis shared by identical axially spaced dual drive sprockets 62R, 62L secured for rotation therewith.

The motor 58 is a 12 volt 9 amp. direct current motor available from W. W. Grainger under the designation Linear Actuator 6Z087. The vehicle 10 supplies the necessary electrical power to the motor 58. Tests have shown that the motor 58 can lift at least 600 pounds. With the components as described herein, it takes approximately 30 seconds to completely raise or lower the movable floor portions 40, 42. It is contemplated that a hydraulic motor would also suffice.

Limit switches 46, 47 (FIG. 3) and electrical relays 49, 51, 53 (FIG. 5) connect to the motor 58 and coordinate the raising and lowering of the floor portions 40, 42, and 44. The relays 49, 51, 53 are located near the motor 58, while the limit switches 46, 47 are mounted in close proximity to the jack screws 52 or the movable portions 40, 42 at the top and bottom of their movement respectively. Relay 51 controls the main power input into the motor 58. Relays 49, 53 are conventional 12 volt, 25 amp. PV relays. Relay 49 is interconnected with relay 51 and the motor 58 so as to cause the motor to turn its shaft 60 in a direction which causes the floor portions 40, 42 to move lower on the jack screws 52. Relay 53 is similarly connected so as to cause movement in an opposite direction.

Two endless loop synchronizing drive chains 66R, 66L engage the respective drive sprockets 62R, 62L and engagedly extend around sprockets 64R, 64L mounted near the top of the inner rear jack screws 52 (FIG. 5). The sprockets 64R, 64L are preferably identical to each other and smaller in diameter than the sprockets 56, 62R, 62L, thus providing synchronization and gear reduction for the drive system.

Two other endless loop drive chains 67R, 67L engagedly extend around the sprockets 56 near the lower ends of the jack screws 52 so as to rotate the jack screws attached thereto in a synchronized manner in response to the rotation of the drive sprockets 64R, 64L. The jack screws 52, the chain 67R, 67L and the motor 58 are arranged so that the jack screws 52 are rotated in one direction when the drive sprockets 62R, 62L of the motor 58 are rotated in one direction, and in an opposite direction when the drive sprockets 62R, 62L are rotated in the opposite direction.

As best understood in view of FIG. 2, a sprocket, chain and jack screw mechanism is provided for each of the lowerable sections 40, 42 of the platform 34. This chain and sprocket drive system provides the synchronization needed to raise and lower the portions 40, 42 simultaneously and in coplanar unison. This prevents the sections of the floor from being vertically staggered, which would cause the person in the wheelchair to be tilted sideways uncomfortably.

Idler or tensioning sprockets 68RF, 68LF, 68RR, and 68LR rotatably mount on the lower floor panel 28A as shown in FIG. 2. The chains 67R, 67L engagedly extend around the respective sprockets 68RF, 68LF, 68RR, and 68LR so that they rotate in the opposite direction as the sprockets 52. Each of the sprockets 68RF, 68LF, 68RR, and 68LR are mounted in a stub axle 88 to take up the slack in the chains 67R, 67L. An axial adjustment slot 70 in the lower floor panel 28A permits the stub axle 88 can be provided for any of the sprockets 68RF, 68LF, 68RR, and 68LR to be moved selectively loosened and retightened to change the tautness of the chains 67R, 67L.

Long unsupported lengths of chain like chain 67R, 67L are prone to drooping and dragging. Therefore, it is desirable to place angle iron strips 71 covered with Lexan™ plastic 73 on the upwardly directed surfaces under the chain, as best seen in FIG. 6. This helps reduce droop, derailments and noise.

The side edges of the intermediate section 44 overlap and rest upon the right and left lowerable sections 40, 42, as shown in FIGS. 2 and 4. The side edges 72, 74 of the intermediate section 44 are preferably tapered so as to allow the wheelchair 20 to be rolled easily thereover. As best seen in FIGS. 4 and 5, the raised part 32A of the lower floor panel 28A which extends over the drive shaft 30 prevents the intermediate section 44 from being lowered as far as the right and left sections 40, 42 of the lowerable platform 34.

It is worthy of noting that the mechanical and electrical components of the lift mechanism do not interfere with its movement.

Although they are not required in the preferred embodiment, bearings or bushings 90 can be attached to the underside of the front and rear shrouds 80, 82 (FIG. 2) to further guide and rotatably support the jack screws 52. The front shroud 80 can be formed with vertical slots for slipping over and extending closely around the tie bars 48 to provide greater structural rigidity. A shroud 84 also extends around the motor 58, synchronizing chains 66R, 66L, and the relays 49, 51 and 53. A peripheral lip or flange 86 can be attached to the upper floor panel 26 of the vehicle 10 by conventional means (not shown) to mount the lift mechanism 29.

In operation, the wheelchair 20 is brought into the vehicle 10 and positioned with the right wheels 22RF, 22RR on the right lowerable section 40 of the platform 34 and the left wheels 22LF, 22LR on the left lowerable section 42. The seat 24 of the wheelchair 20 is disposed over the intermediate section 44. The ground clearance under the wheelchair 20 may be affected by the height of the seat 24, the rear axle 23 or support members extending under the seat. Most conventional wheelchairs have about four inches of ground clearance.

To lower the wheelchair 20 so that the person therein can see through the windows 16 (including the windshield 20) better, the motor 58 can be activated by a conventional electric control device or switch (not shown) located in the vehicle 10. The motor 58 is preferably powered by the vehicle's electrical system or battery, but a dedicated battery could be utilized instead. When the motor shaft 60 turns in a given direction, the jack screws 52 all rotate in that direction, which causes the sections 40, 42 and 44 to progress downwardly along the longitudinal axis of the jack screws 52. The dual sprockets 62R, 62L and timing chains 66R, 66L insure that the motor 58 rotates the respective drive sprockets 64R, 64L, and therefore the sprockets 52 and the chains 67R, 67L, at the same effective rate. Thus, the right and left lowerable sections 40, 42 are lowered or raised together at the same rate within the space between the upper and lower floor panels 26, 28. The depth is infinitely adjustable due to the threads on the jack screws 52.

As the right and left lowerable sections 40, 42 descend along their respective jack screws 52, the intermediate section 44 descends by gravity. Therefore, the intermediate section 44 is initially lowered in conjunction with the right and left lowerable sections 40, 42. Eventually, the downward travel of the intermediate portion 44 is limited by the hump 32. Thereafter, the right and left lowerable sections 40, 42 will continue to descend without the intermediate section 44. Generally, the intermediate section 44 can be lowered approximately four inches, whereas the right and left sections 40, 42 can be lowered approximately six to ten inches, preferably about eight inches. Fortunately, due to the ground clearance of the wheelchair 20, this disparity of depths is not a problem. The limit switches 47 can be positioned to be engaged by the sections 40, 42 at the desired depth. Consequently, the switches 47 trip the relay 51 which stops the motor 58.

To raise the lowerable platform 34, one merely reverses the direction of the motor 58. The sprockets 62, 64 then rotate in an opposite direction, which causes the sprockets 56, 62R, 62L, 64R, 64L; chains 66, 76; and jack screws 52 to rotate in an opposite direction as well. The rotating jack screws 52 cause the sections 40, 42 to move upwardly along the longitudinal axis of the jack screws 52. As the right and left lowerable sections 40, 42 are raised, they eventually contact the lower side of the intermediate section 42. Thereafter, the intermediate section 44 moves in conjunction with the right and left lowerable sections 40, 42 until the limit switches 46 are engaged to trip the relay 51 and stop the motor 58. At that point the sections 40, 42, 44 are essentially coplanar with the upper floor panel 26.

One can easily understand from FIGS. 2 and 3 that a single section platform can be formed from sections 40, 42, 44. This single section platform could be disposed on either side of the hump 32 or may even extend across the hump 32 if the space between the upper floor panel 26 and the hump 32 is sufficient to achieve the desired lowering of the wheelchair 20. Furthermore, some vehicles have front wheel drive and thus do not have a hump. The same lift mechanism as described above can raise and lower a single section platform.

From the foregoing, it will be understood that the present invention is extremely versatile. Additional motors can be used to power the lift mechanism, if needed. The number of sprockets, jack screws and chains can be varied. Those components can also be arranged in a variety of different configurations. The invention is readily adaptable to front wheel drive vehicles, as well as rear wheel drive vehicles. The lift mechanism can be contained in a substantially sealed housing or insert for retrofitting into existing vehicles as shown in the figures. However, the lift mechanism can also be placed in between the upper and lower floor panels without a separate housing. The latter arrangement might be conducive to making the lift mechanism part of the original equipment of the van.

Thus, it can be seen that the present invention at least accomplishes its stated objectives.

In the drawings and specification there has been set forth a preferred embodiment of the invention, and although specific terms are employed, these are used in a generic and descriptive sense only and not for purposes of limitation. Changes in the form and proportion of parts as well as in the substitutions of equivalents are contemplated as circumstances may suggest or render expedient without departing from the spirit or scope of the invention as further defined in the following claims.

What is claimed is:

1. A vehicle having accommodations for a person in a wheelchair, comprising:

a chassis on the vehicle comprising an upper floor panel disposed within the vehicle;

the upper floor panel having an aperture therein and a lowerable portion normally disposed in the aperture being adapted to support the wheelchair, the lowerable portion having opposite front and rear ends which are both lowerable with respect to the upper floor panel;

a lift mechanism mounted below the upper floor panel for raising and lowering the lowerable portion with respect to the upper floor panel;

the lift mechanism including a plurality of horizontally spaced upright jack screws rotatably mounted below the upper floor panel for engaging respective internally threaded members rigidly mounted on the lowerable portion, and a reversible motor drivingly connected to the jack screws;

the motor and the jack screws being drivingly connected by a first sprocket fixed for rotation with the motor, second sprockets fixed for rotation with the jack screws, at least one endless loop chain connecting the sprockets, and at least one idler sprocket located between an adjacent pair of the second sprockets for engaging the chain to take up slack in the chain between the pair of second sprockets.

2. The vehicle of claim 1 wherein the lowerable portion is adjustably lowerable to one of a plurality of levels below the upper floor panel.

3. The vehicle of claim 2 wherein the lowerable portion is adjustably lowerable above a lower floor panel of the chassis.

4. The vehicle of claim 1 wherein the lift mechanism raises and lowers both the front end and rear end of the lowerable portion in unison such that the lowerable portion is always substantially parallel to the upper floor panel.

5. The vehicle of claim 1 wherein the lift mechanism comprises a plurality of upright jack screws mounted under the upper floor and outwardly adjacent the lowerable portion.

6. The vehicle of claim 1 wherein the lowerable portion comprises first and second horizontally spaced apart lowerable sections, and a third lowerable section interposed between and overlapping the first and second lowerable sections, whereby the third lowerable section lowers by gravity when the first and second lowerable sections are lowered and raises when engaged and lifted from below by the first and second lowerable sections raised by the lifting mechanism.

7. A vehicle having accommodations for a person in a wheelchair, comprising:

a chassis on the vehicle comprising an upper floor panel disposed within the vehicle;

the upper floor panel having an aperture therein and a lowerable portion normally disposed in the aperture being adapted to support the wheelchair, the lowerable portion having opposite front and rear ends which are both lowerable with respect to the upper floor panel;

a lift mechanism mounted below the upper floor panel for raising and lowering the lowerable portion with respect to the upper floor panel;

the lowerable portion comprising first and second horizontally spaced apart lowerable sections, and a third lowerable section interposed between and overlapping the first and second lowerable sections, whereby the third lowerable section lowers by gravity when the first and second lowerable sections are lowered and raises when engaged and lifted from below by the first and second lowerable sections raised by the lifting mechanism.

8. A vehicle having accommodations for a person in a wheelchair, comprising:

a chassis on the vehicle comprising an upper floor panel disposed within the vehicle;

the upper floor panel having an aperture therein and a lowerable portion normally disposed in the aperture being adapted to support the wheelchair, the lowerable portion having opposite front and rear ends which are both lowerable with respect to the upper floor panel;

a lift mechanism mounted below the upper floor panel for raising and lowering the lowerable portion with respect to the upper floor panel;

the lift mechanism comprising a plurality of horizontally spaced rotatable elongated jack screws mounted in an upright position below the upper floor panel and outwardly adjacent the lowerable portion, each jack screw having an upper and lower end, a sprocket being secured for rotation with the lower end of each of the jack screws respectively, a reversible drive motor mounted on the chassis and having a drive sprocket thereon for drivingly engaging at least one endless loop chain drivingly connected to the plurality of sprockets so as to rotate each of the jack screws in one direction when the drive sprocket is rotated in the one direction by the motor and in an opposite direction when the drive sprocket is rotated in the opposite direction by the motor, and corresponding plurality of internally threaded members on the lowerable portion adapted to threadingly receive the respective jack screws, whereby the lowerable portion is lowered and raised in response to the rotation of the jack screws.

9. The vehicle of claim 8 wherein the internally threaded members on the lowerable portion comprise elongated tie bars mounted on the lowerable portion and having ends that protrude under the upper floor panel, each of the ends having an internally threaded hole extending vertically therethrough for being matingly engaged by the jack screws.

10. The vehicle of claim 8 wherein the internally threaded members and the jack screws have mating Unified National Coarse threads thereon.

11. The vehicle of claim 8 wherein the lowerable portion comprises a first lowerable section horizontally spaced from a second lowerable section so as to support horizontally spaced wheels of the wheelchair.

12. The vehicle of claim 11 comprising a first and less loop chain operatively associated with the first lowerable section and a second endless loop chain mechanism operatively associated with the second lowerable section; and further comprising at least one timing chain interconnecting the first and second endless loop chains so as to move of the first and second lowerable sections in coplanar unison.

* * * * *